United States Patent [19]

Moran et al.

[11] 3,920,093

[45] Nov. 18, 1975

[54] OMNIDIRECTIONALLY STEERABLE VEHICLE

[76] Inventors: Robert F. Moran; Darryl W. Sanders, both of, c/o Mrs. L. C. Shelton, Rte. No. 23, Topside Road, Knoxville, Tenn. 37920

[22] Filed: Jan. 26, 1973

[21] Appl. No.: 327,248

Related U.S. Application Data

[63] Continuation of Ser. No. 138,058, April 28, 1971, abandoned.

[52] U.S. Cl. .................... 180/21; 280/266; 180/52
[51] Int. Cl. ...................... B62d 61/00; B62k 21/00
[58] Field of Search...... 180/21, 13, 26 X, 52, 77 S; 280/43, 87 R, 91, 93

[56] References Cited
UNITED STATES PATENTS

| | | |
|---|---|---|
| 2,661,672 | 12/1953 | Fairbanks.......................... 180/26 R |
| 2,715,534 | 8/1955 | Hodge et al. .......................... 280/91 |
| 3,208,764 | 9/1965 | Holland ................................ 280/87 |
| 3,325,180 | 6/1967 | Bandini.............................. 180/77 S |
| 3,336,993 | 8/1967 | Carobbe............................ 180/26 R |
| 3,690,697 | 9/1972 | Bohanski .......................... 180/77 S |
| 3,700,058 | 10/1972 | Kowahara.............................. 180/21 |

Primary Examiner—Kenneth H. Betts
Assistant Examiner—Jack D. Rubenstein
Attorney, Agent, or Firm—Fitch, Even, Tabin & Luedeka

[57] ABSTRACT

An omnidirectionally steerable self-propelled vehicle including at least two spaced-apart wheel means turnable in unison with rotation of an operator support to direct the forward heading of the vehicle and the operator.

6 Claims, 5 Drawing Figures

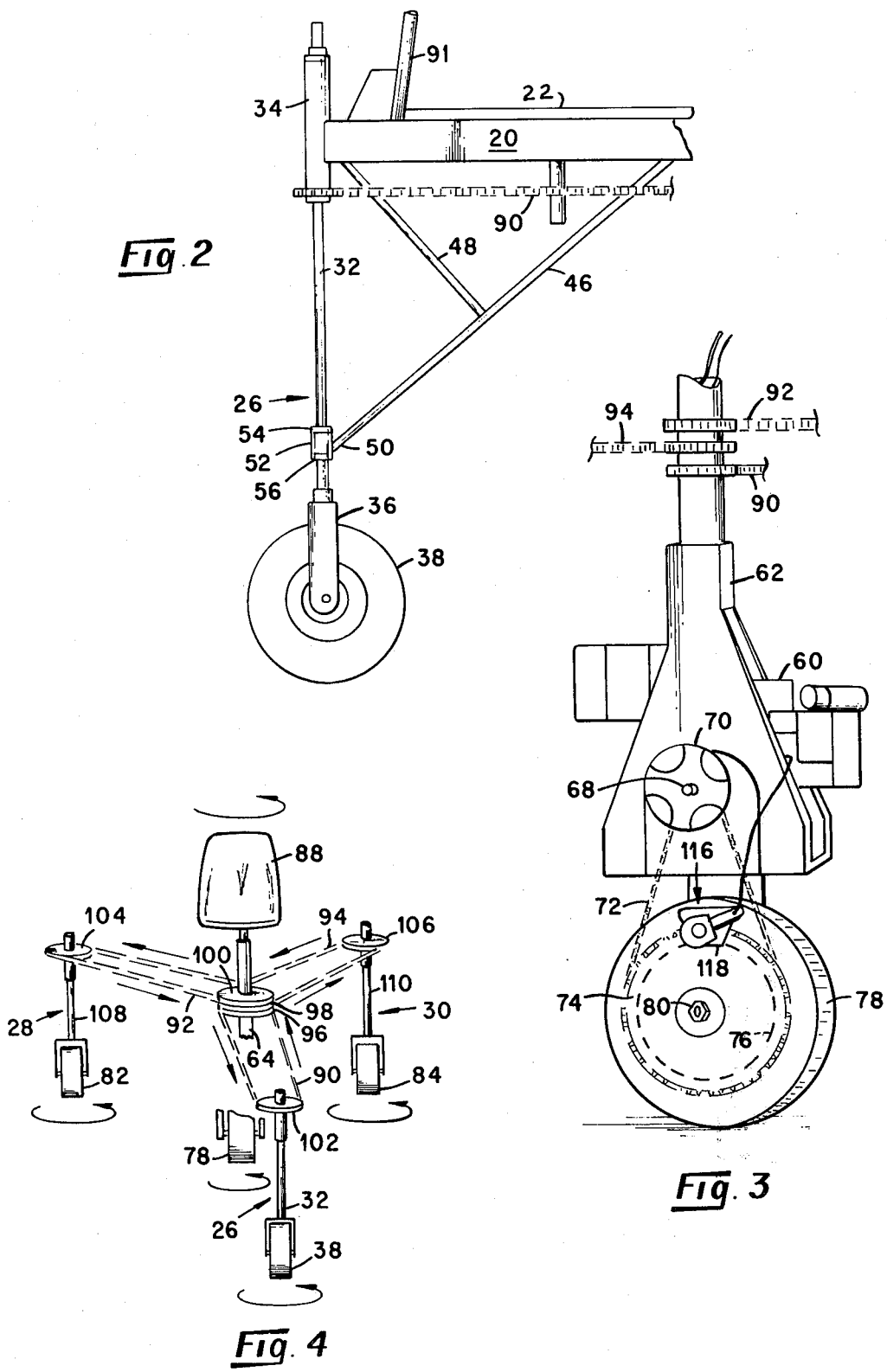

OMNIDIRECTIONALLY STEERABLE VEHICLE

This is a continuation application of copending application Ser. No. 138,058, filed Apr. 28, 1971, entitled "Omnidirectionally Steerable Vehicle" now abandoned.

This invention relates to self-propelled wheeled vehicles.

Most, if not all, sizable cities are formed in grid patterns where the streets of the city intersect at many points forcing a stop and go operation of vehicles operating on the streets at an average speed of about eight miles per hour. It is on these streets where congestion has become the order of the day and greatest tension exists between people, movement systems and the environment which man has built.

Paradoxically, cities need vehicles to transport people, goods and services, however, the same vehicles which supplement the vital economic life of the city are threatening its existence because the design of these vehicles is ill suited for urban use. The ever increasing congestion continues to stifle both ease of movement and quality of urban living.

It is therefore an object of the present invention to provide a vehicle which is particularly adapted to urban use. It is also an object of the present invention to provide an inexpensive, but highly maneuverable, vehicle. Other objects and advantages of the invention will be recognized from the following description, including the drawings in which:

FIG. 2 is a fragmentary view of a peripheral wheel assembly of the vehicle of FIG. 1;

FIG. 3 is a fragmentary view of a central wheel assembly of the vehicle of FIG. 1;

FIG. 4 is a schematic representation of the vehicle of FIG. 1 showing the steering relationship of several of the components of the vehicle.

Figure 1:
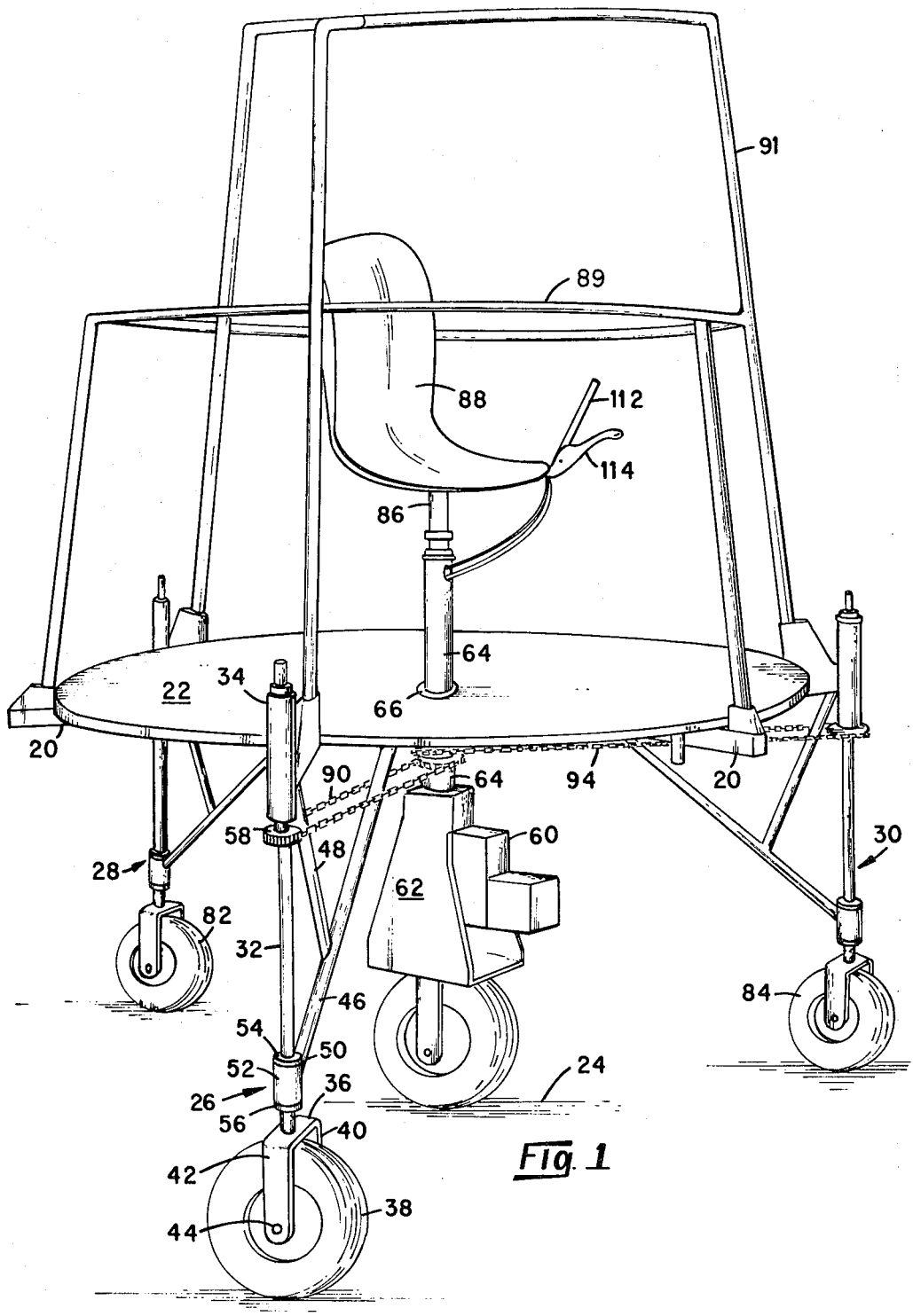
FIG. 1 is a representation of a vehicle embodying various features of the invention.

The vehicle of the present disclosure comprises a frame means having a plurality of ground-engaging roller means, such as wheels, thereon adapted to support the frame means above a generally horizontal surface. At least one of the wheels is drivingly connected to a motor means for propelling the vehicle over the supporting surface. Each of the wheels, including the driving wheel, is rotatable about a generally vertical axis and not less than two of the wheels are connected for rotation about their vertical axes to an operator support which is rotatably mounted with respect to said frame means.

By means of the connection between the operator support and the wheels, the forward direction of the vehicle may be changed by the operator rotating his support in the direction he wishes the vehicle to travel. This action simultaneously rotates at least two and preferably all of the wheels in the same angular direction and to the same angular extent. By design, the frame remains stationary while the wheels rotate relative to the frame, so that steering of the vehicle in the desired direction occurs without any turning of the frame. The steering action simultaneously turns the operator relative to the frame in the same angular direction and to the same angular extent as the wheels, thereby keeping the operator facing at all times in the direction of forward movement of the vehicle.

Referring to the Figures, one embodiment of the vehicle includes a frame 20 comprising a circular platform 22 supported above a generally horizontal supporting surface 24, such as the ground or a roadway, by wheel means. In the illustrated embodiment, three wheel assemblies 26, 28, and 30, depend from the platform 22 at positions spaced about 120° apart about the circumferential edge of the platform and form a tripod type of stable support for the vehicle. By reason of the several spaced apart wheels which engage the ground, the platform is held nonrotatable against turning moments developed during steering operations as will be further discussed hereinafter.

Each of the illustrated wheel assemblies comprises a shaft 32 mounted in a bearing member 34 fixedly secured to the periphery of the platform 22 thereby making the shaft 32 rotatable about its vertical axis independently of the platform. The shaft 32 depends generally perpendicularly from the platform and is provided with a fork 36 at its lower end, such fork 36 receiving a wheel 38 between its leg portions 40 and 42. Axle means 44 disposed horizontally between the leg portions 40 and 42 of the fork 36 serves to rotatably mount the wheel 38 in a vertical plane between the fork leg portions. The fork 36 is rigid with the shaft 32, hence rotation of the shaft 32 about its longitudinal axis serves to turn the wheel 38 and change its forward direction. The rigidity of the shaft 32 is increased as necessary by means of structural braces 46 and 48 leading from the shaft 32 to the platform 22. That end 50 of the brace 46 which is connected to the shaft 32 is rotatably secured to the shaft by means of a bearing 52 whose position on the shaft is maintained through the use of collars 54 and 56 encircling and fastened to the shaft 32 at positions above and below the bearing 52. The shaft 32 is also provided with a sprocket 58 keyed to the shaft or otherwise held against rotation with respect thereto. As will appear more fully hereinafter, the sprocket 58 serves to receive a drive chain which transmits to the shaft 32 a drive force which is suitable to rotate the shaft 32 and bring about a turning of the wheel 38.

In the preferred vehicle, each wheel of the vehicle is capable of being turned through 360° about a vertical axis thereby permitting the vehicle to be steered in any direction along a generally horizontal supporting surface. Less than 360° of rotational freedom is suitable in vehicles for certain uses but at the sacrifice of maneuverability of the vehicle. Maximum maneuverability of the vehicle is desired so as to make the vehicle capable of moving safely and efficiently on and along crowded urban streets under stop and go traffic conditions.

Driving force for propelling the vehicle over a supporting surface is developed from motor means associated with one or more of the wheel means and in FIG. 3 there is shown a motor 60 mounted in a harness 62 on a shaft 64, extending upwardly through a bearing member 66 disposed centrally of the platform 22 and which secures the shaft 64 rotatable with respect to the platform 22. The shaft 68 of the motor 60 is connected through a clutch 70 and drive chain 72 to a disk sprocket 74 attached to the rim 76 of a drive wheel 78 so that when the motor 60 is running and the clutch 70 is engaged, the wheel 78 is caused to turn about a horizontal axle 80 and move the vehicle forward in the direction in which the driving wheel 70 and the several peripheral wheels 38, 82 and 84 are directed. Other suitable power systems will be apparent when given the present disclosure, such as for example an electric motor associated with each wheel with the several motors receiving driving power from a common energy source such as a battery or plurality of batteries. In any event, the drive wheel (or wheels) is to remain free to turn in unison with and to the same angular extent as the other wheels of the vehicle so as to provide the desired maneuverability of the vehicle.

The upper part 86 of the motor-mounting shaft 64 receives a seat 88 on which an operator positions himself. The seat 88 is rigidly secured to the shaft 64 so that when the operator turns himself and the seat, the shaft 64 is likewise turned about its longitudinal vertical axis and the wheel 78 is caused to change directions. In the vehicle illustrated in FIG. 1, the operator conveniently changes the direction in which he faces by grasping a hand rail 89 supported at an appropriate height above the platform 22 by structural means 91. As he rotates, his seat 88, he simultaneously rotates the drive wheel 78 and the peripheral wheels 38, 82 and 84.

With particular reference to FIG. 4, the three periphery wheel assemblies 26, 28 and 30 of the illustrated vehicle are connected to the central shaft 64 as by means of chains 90, 92 and 94, respectively, which engage sprockets 96, 98 and 100, respectively, secured on shaft 64 and sprockets 102, 104 and 106 secured on shafts 32, 108 and 110 of the wheel assemblies 26, 28, and 30, respectively. Thus, when the central shaft 64 is turned by the action of the operator, the several wheel assembly shafts, hence the several peripheral wheels 38, 82, and 84 are turned in unison with the central shaft 64 and with each other and with the central drive wheel 78. By reason of their interconnection, the degree and directionality of the angular movement of the central shaft 64 is reproduced simultaneously at each of the shafts 32, 108 and 110 so that all the wheels, including the central driving wheel, at all times are directed in the same forward direction. Consequently, any change in the forward direction of the operator's seat 88 and shaft 64 results in a like change in the forward direction of the peripheral wheels 38, 82 and 84 and a like change in the forward direction of the vehicle.

Notably, it is the changing of position of the operator in a conscious manner which effects steering of the vehicle. For steering the disclosed vehicle, the operator moves his seat 88 so that it faces him and the seat in the desired forward direction. This rotation of the seat rotates the central shaft 64 about its longitudinal axis and turns the driving wheel 78 so that this wheel faces in the forward direction and will propel the vehicle forwardly when the wheel is turned on its axle 80 by the motor 60.

As the same time the central shaft 64 is rotated about its longitudinal axis, the sprockets 96, 98 and 100 secured thereon are also turned. By reason of the chain connections between the sprockets on the central shaft 64 and the shafts 32, 108 and 110 of the several peripheral wheel assemblies 26, 28 and 30, when the central shaft 64 turns, the shafts of the peripheral wheel assemblies also turn in the same direction and to the same angular extent as the central shaft. When the shafts 32, 108 and 110 turn, their respective wheels 38, 82 and 84 also turn, thereby keeping all the wheels directed in a single direction at all times. This described turning of the several wheels of the vehicle occurs without rotation of the frame by reason of the spaced-apart wheels which frictionally engage the ground and hold the frame against any turning movement. Therefore, contrary to conventional vehicles which are steered by creating a turning movement which turns the vehicle frame and consequently require relatively large turning areas, the disclosed vehicle with its nonturning frame can be redirected 360° in an area not greater than the area of the vehicle itself and without movement of the vehicle itself but by turning only the wheels (and operator support).

Figure 5:
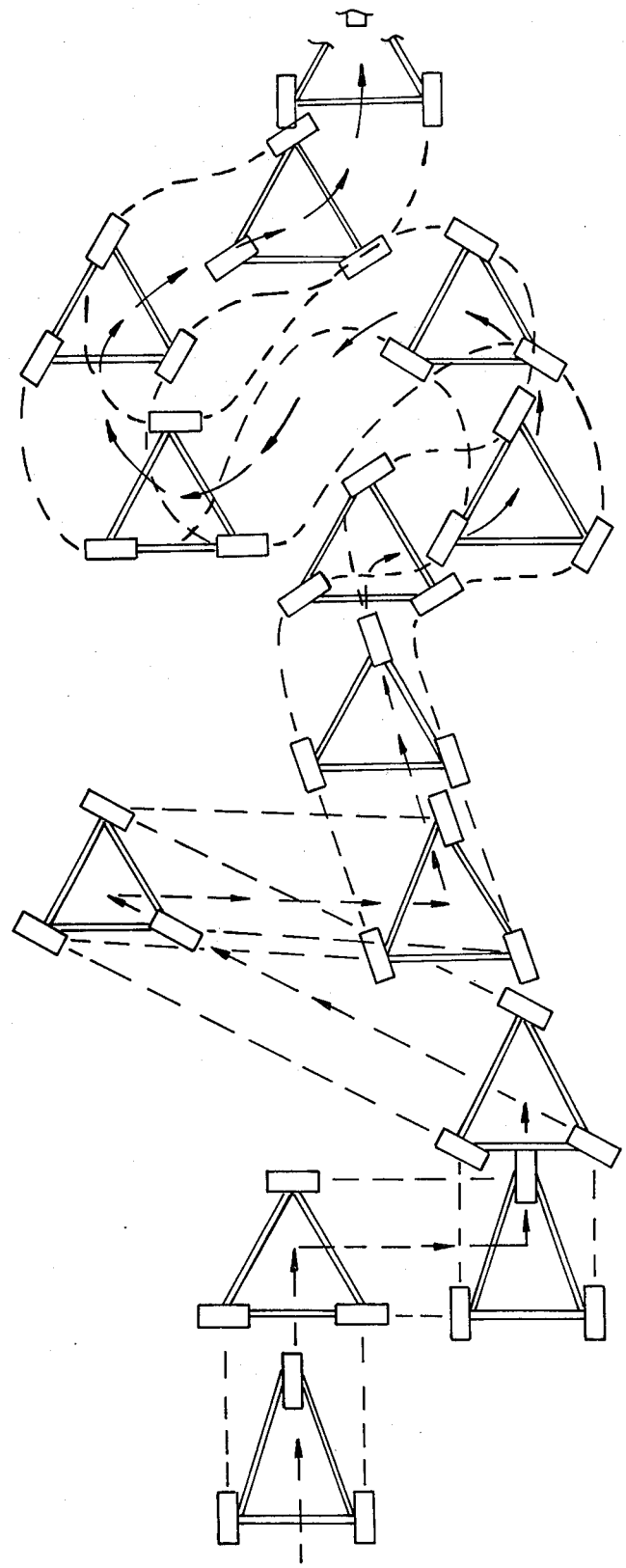
FIG. 5 is a diagram depicting the maneuverability of a vehicle in accordance with the invention.

When the vehicle is in motion and the operator wishes to change the forward direction of the vehicle he rotates his seat, and himself, to cause all the wheels to assume the new forward direction and cause the vehicle to change its course to the new direction. Several possible maneuvers of the disclosed vehicle are illustrated in FIG. 5. By reason of the infinite angular adjustability of the several wheels and their turning in unison toward a new forward direction in response to operator control, the vehicle is capable of right angle turns and both long and short turns, including acute angle turns. Reverse movement of the vehicle is accomplished by turning the wheels 180°.

With the extreme maneuverability afforded by the disclosed vehicle, it becomes important for safety reasons that the operator remain oriented at all times in the forward direction. To this end, the steering movement of the vehicle wheels is regulated or chosen by the operator turning his support, along with himself, into alignment with the desired forward direction as noted hereinbefore. Absent this feature of the invention, the operator tends to lose his orientation with respect to the direction of the wheels and consequently lose control over the vehicle.

In the disclosed vehicle the operator at all times faces in a forward direction which he chooses by consciously and physically moving his seat or other support and thereby maintains himself aligned to keep a proper lookout for traffic conditions.

Whereas all of the wheels of the preferred vehicle turn in unison as described hereinbefore, it will be realized that two spaced apart wheels, such as the central driving wheel 78 and one of the peripheral wheels 38, when turned in unison, and with the remaining wheels castering, provides steering capability to the vehicle. In this latter instance, the response of the vehicle to steering movement by the operator is slightly less than simultaneous due to the castering action of the free wheels and therefore less desirable in some instances.

The motor 60 of the vehicle illustrated in FIGS. 1 to 3 is controlled from the operator's support 88 by throttle and brake controls 112 and 114, respectively. The throttle control 112 increases or decreases the speed of the motor 60 to similarly affect the speed of the vehicle in a conventional manner. The illustrated brake means 116 comprises a friction element 118 adapted to frictionally engage the flat opposite sides of the disk sprocket 74 secured to the rim 76 of the drive wheel 78. More or less frictional engagement between the friction element 118 and the disk sprocket 74 and resultant more or less braking of the vehicle is developed through manipulation of the brake control 114 located on or near the operator support. Other and alternate suitable controls will be recognized by one skilled in the art.

Maneuvering the vehicle into limited spaces, such as a parking space parallel to a curb is a simple matter since the vehicle can execute a right angle turn. Driving in urban traffic is significantly simplified by the omnidirectional steerability of the vehicle in that the vehicle requires considerably less turning room than is required by conventional vehicles.

Whereas the vehicle has been described in terms of transporting persons along a roadway, it will be recognized that the vehicle is also useful in other capabilities such as a lift truck, golf cart and the like, or in similar applications where extreme maneuverability is desired or required.

It is not intended that the invention be limited to the specific embodiments employed for descriptive purposes herein, but rather, it is intended to cover all modifications and alternate constructions falling within the spirit and scope of the invention as defined in the appended claims.

What is claimed is:

1. An omnidirectionally steerable vehicle for travel over a generally horizontal supporting surface while carrying an operator thereon comprising in combination
   motor means,
   frame means,
   a plurality of spaced apart wheel means supporting said frame above said surface,
   means rotatably mounting each of said wheel means for rotation through 360° about an upright axis, at least one of said wheel means being drivingly connected to said motor means whereby said vehicle is propelled along said supporting surface upon turning of said driven wheel means by said motor means,
   operator support means receiving said operator thereon,
   means mounting said operator support means rotatably with respect to said frame means and defining an upright axis about which said operator support means, hence said operator, is rotatable 360° with respect to said frame means,
   means connecting at least two of said wheel means one to another and to said means mounting said operator support means and restraining said connected wheel means against rotation about their axes when said means is inactivated and turning said connected wheel means in unison in the same direction and to the same angular extent when said means is activated, whereby said frame means is stabilized against rotation with respect to said supporting surface when said connected wheel means are rotated in unison about their respective axes,
   means mounted on said frame means and engageable by said operator for simultaneously rotating said operator support means with respect to said frame means and activating said means connecting said wheel means to one another whereby said operator support means and said connected wheel means are caused to rotate in unison in the same direction and to the same angular extent and said operator on said operator support means is oriented in the forward direction of movement of said vehicle at all times.

2. The omnidirectionally steerable vehicle of claim 1 wherein said plurality of wheel means comprises three wheel means spaced about 120° apart about the periphery of said frame means.

3. The omnidirectionally steerable vehicle of claim 1 wherein said operator support means comprises a seat means.

4. The omnidirectionally steerable vehicle of claim 1 wherein all of said plurality of wheel means are connected one to another such that neither wheel means is independently rotatable about its respective upright axis.

5. The omnidirectionally steerable vehicle of claim 1 wherein said means mounted on said frame means and engageable by said operator comprises a rail means substantially encircling said operator support means and disposed at a height above said frame means sufficient to place said rail means within the reach of an operator on said operator support means.

6. A motorized vehicle for travel over a generally horizontal supporting surface comprising in combination
   a frame having a substantially circular platform mounted thereon,
   a driving wheel means operatively mounted on said frame and substantially in the center of said circular platform, said driving wheel means including motor means for rotating said driving wheel to propel said vehicle, said driving wheel means having an upright axis about which said wheel is rotatable through 360°,
   three spaced apart wheel means, in combination with said driving wheel means, supporting said frame above said supporting surface, said spaced apart wheel means being separated one from the other by about 120° and each of said spaced apart wheel means having an upright axis about which each wheel means is rotatable through 360°,
   steering means including operator support means adapted for receiving an operator thereon, said operator support means being mounted on said driving wheel means axis for turning in unison therewith to steer said vehicle in the direction in which said operator is facing,
   flexible loop means independently connecting each of said spaced apart wheel means to said steering means whereby said spaced apart wheel means turn in unison with said driving wheel means for steering said vehicle toward the direction in which said operator is facing,
   rail means mounted on said frame means and engageable by said operator, said rail means substantially encircling said operator support means in position to be grasped by said operator for aiding in rotation of said operator support means.

* * * * *